United States Patent Office 2,763,675
Patented Sept. 18, 1956

2,763,675

CARBOXYMETHYLHEPTAMETHYLCYCLO-TETRASILOXANE

Robert J. Prochaska, Lanesboro, Mass., assignor to General Electric Company, a corporation of New York No Drawing. Application September 25, 1953,
Serial No. 382,469

2 Claims. (Cl. 260—448.2)

This invention is concerned with a novel methylpolysiloxane and more particularly relates to the compound carboxymethylheptamethylcyclotetrasiloxane having the formula

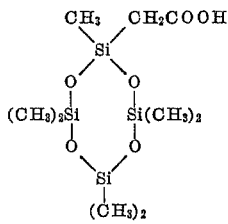

and method for preparing the same.

The above-identified compound can be employed as an intermediate in the preparation of other compositions. Thus, the carboxymethylheptamethylcyclotetrasiloxane (hereinafter referred to as "carboxysiloxane") can be interacted with monohydric (e. g., 2-ethylhexanol, n-decanol, etc.) or dihydric alcohols (e. g., ethylene glycol, propylene glycol, dipropylene glycol, etc.) under esterification conditions, that is, using acidic catalysts, for the purpose of giving esters of the aforesaid carboxysiloxane. These esters have utility as plasticizers for vinyl halide resins, for instance, polyvinyl chloride, copolymers of vinyl chloride and vinyl acetate, etc. In preparing such esters, one may interact, for example, long-chain alcohols, for instance, octyl alcohol (e. g., 2-ethylhexanol), individual or mixtures of isomeric nonyl alcohols, etc., to give esters of the type (taking 2-ethylhexanol as an example of the monohydric alcohol) having the formula

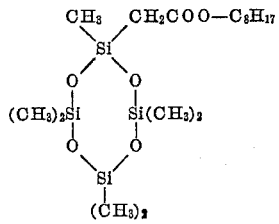

When using dihydric alcohols, such as ethylene glycol or diethylene glycol, it will be apparent that for complete esterification, at least two mols of the carboxysiloxane will react with one mol of the dihydric alcohol to give compositions having the formula

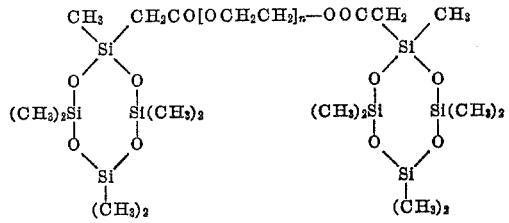

where $n$ is an integer equal to at least 1.

In order that those skilled in the art may better understand how the above carboxysiloxane may be prepared, the following example is given by way of illustration and not by way of limitation.

*Example*

A Grignard reagent was prepared from a mixture of 5 grams magnesium turnings and 70 grams of chloromethylheptamethylcyclotetrasiloxane in 500 cc. absolute diethyl ether, employing the usual techniques in Grignard preparation. The resulting Grignard reagent was poured over about 200 grams cracked solid carbon dioxide and stirred until the latter had substantially completely evaporated. A 3 per cent solution of hydrochloric acid (200 cc.) mixed with 200 grams of ice was added to the ether solution with vigorous stirring. The ether layer which separated was removed, washed several times with a 10 per cent aqueous sodium bicarbonate solution, and thereafter washed several times with water. The ether layer was separated and dried over anhydrous magnesium sulfate and the ether removed by distillation. The residual liquid was fractionally distilled under reduced pressure to give a fraction boiling at 110–111° C. at 0.5 mm. This material solidified at room temperature and had a melting point of 49–51° C. Analysis of this composition showed it to be carboxymethylheptamethylcyclotetrasiloxane of the above formula as evidenced by the fact that it was found to contain 7.14 per cent hydrogen, 31.7 per cent carbon, and 33.1 per cent silicon and had a neutral equivalent of 350 (calculated: 7.07 per cent hydrogen, 31.8 per cent carbon, 32.9 per cent silicon and neutral equivalent 340). The sodium salt of this carboxysiloxane was a white amorphous powder which on analysis was shown to contain 6.05 per cent hydrogen and 28.3% carbon (calculated 6.35 per cent hydrogen and 29.8 per cent carbon). The carboxymethylheptamethylclclotetrasiloxane is soluble in ethyl alcohol, diethyl ether, benzene and petroleum ether. It is substantially insoluble in water.

In addition to the uses described above to which the carboxy siloxane can be put, the carboxy siloxane can also be esterified as described above and thereafter polymerized either alone or with other cyclic diorganosiloxanes, in the presence of certain alkaline agents, such as small amounts of potassium hydroxide, to effect rearrangement whereby one can obtain methylpolysiloxanes which can be converted by heat or by other means, usually in the presence of a curing agent, such as benzoyl peroxide, to solid elastic, substantially infusible and insoluble products which have good resistance to heat and remain flexible at low temperatures. The presence of the ester group in such methylpolysiloxanes permits modification of the properties of the aforesaid converted methylpolysiloxanes. Alternatively, the convertible methylpolysiloxane (prior to conversion to the cured state) can also be treated to hydrolyze the ester group to permit substitution of the alcohol residue of the aforesaid ester group with other functional groupings, such as, for example, amido groupings, etc.

What I claim as new and desire to secure by Letters Patent of the United States is:

1. Carboxymethylheptamethylcyclotetrasiloxane having the formula

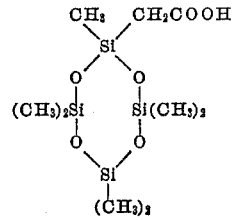

2. The process for preparing carboxymethylheptamethylcyclotetrasiloxane which comprises (1) forming a Grignard reagent of chloromethylheptamethylcyclotetrasiloxane in diethyl ether, (2) subjecting the Grignard reagent to carbonation by contacting the latter with solid carbon dioxide, and (3) thereafter isolating the formed carboxymethylheptamethylcyclotetrasiloxane.

References Cited in the file of this patent

UNITED STATES PATENTS 2,474,578    Gilliam _____ June 28, 1949

OTHER REFERENCES

Kriebel et al.: "Jour. Am. Chem. Soc.," vol. 68 (1946), pp. 2291–93.

Sommer et al.: "Jour. Am. Chem. Soc.," vol. 71 (1949), p. 1509.